Figure 1:
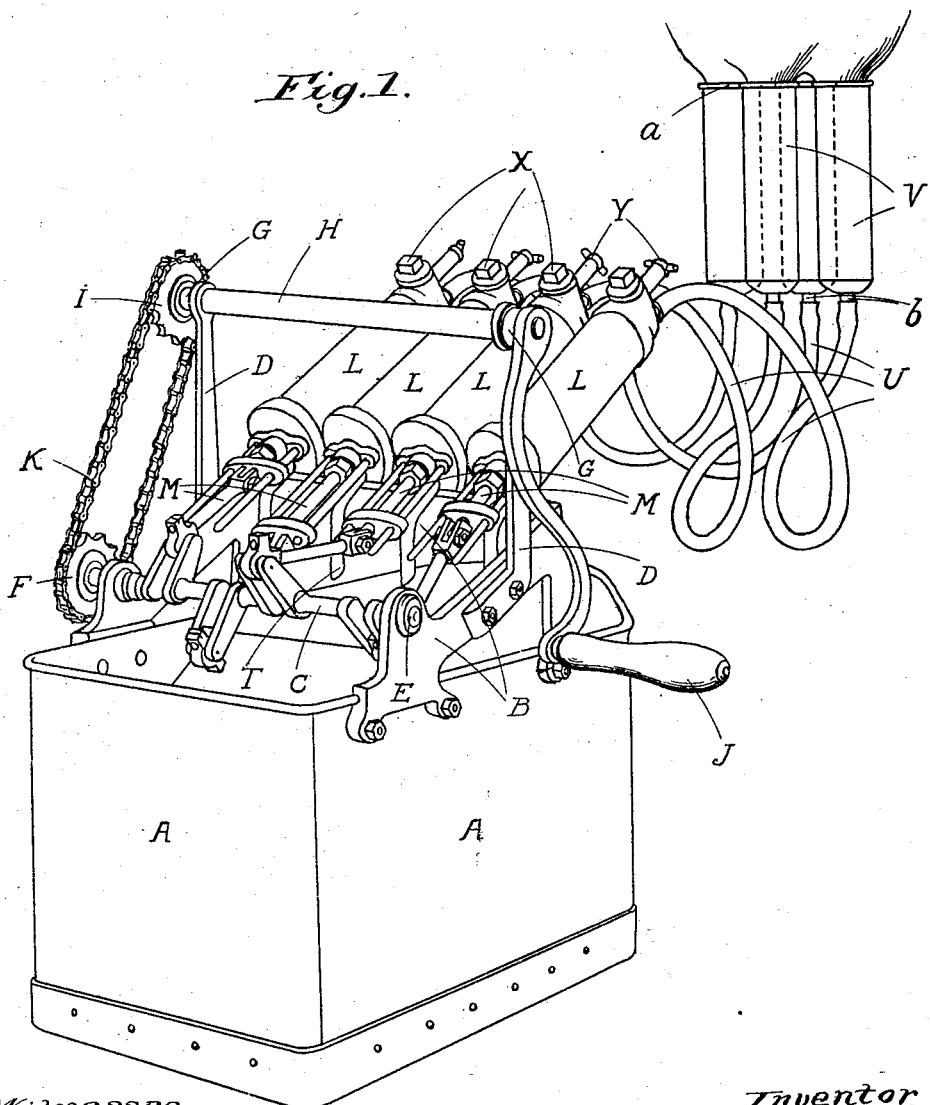

No. 823,316. PATENTED JUNE 12, 1906.
P. ANDERSEN.
MILKING APPARATUS.
APPLICATION FILED NOV. 3, 1905.

2 SHEETS—SHEET 1.

No. 823,316. PATENTED JUNE 12, 1906.
P. ANDERSEN.
MILKING APPARATUS.
APPLICATION FILED NOV. 3, 1905.
2 SHEETS—SHEET 2.
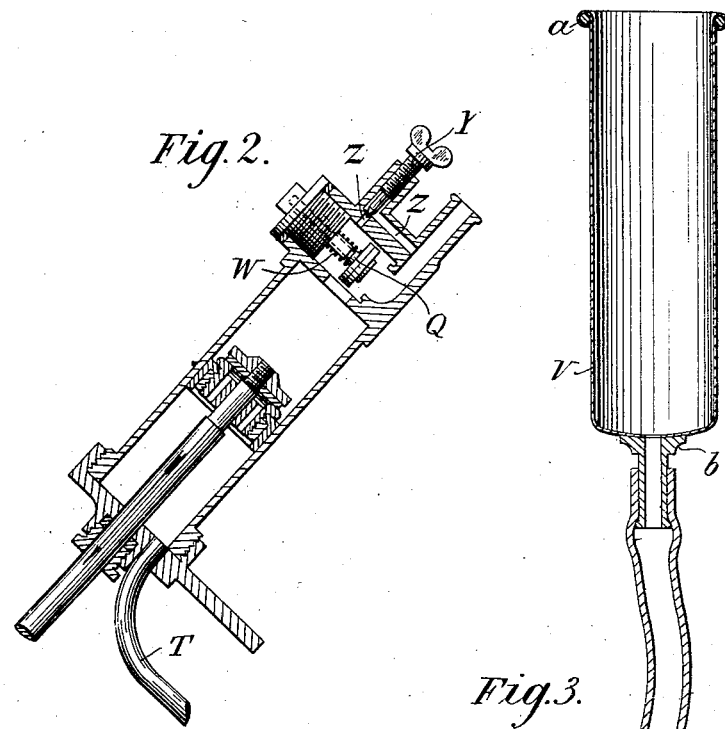
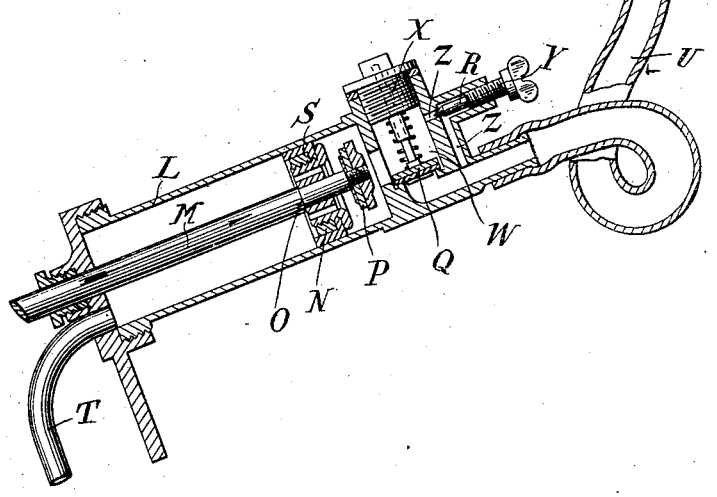
Witnesses.
L. E. Money.
W. F. Crossman.
Inventor.
Peter Andersen
By C. F. Belt
Attorney.

UNITED STATES PATENT OFFICE.

PETER ANDERSEN, OF LANGDRÄTHOF, HADERSLEBEN, GERMANY.

MILKING APPARATUS.

No. 823,316.　　　　Specification of Letters Patent.　　　Patented June 12, 1906.

Application filed November 3, 1905. Serial No. 285,718.

*To all whom it may concern:*

Be it known that I, PETER ANDERSEN, a subject of the German Emperor, residing at Langdräthof, Hadersleben, in the Kingdom of Prussia, Germany, have invented certain new and useful Improvements in Milking Apparatus, of which the following is a specification.

This invention relates to improvements in milking-machines in which a separate and independent pump is provided to extract milk from each teat of the cow or other animal operated upon.

This invention resides in improvements upon the apparatus disclosed and broadly claimed in the British Patent No. 6,043, granted to me March 31, 1900; and the objects of my improvements are, first, to provide a satisfactory teat-cup which will milk efficiently under varying conditions without injury to the cow, and, second, to enable adjustment of the pumping force to be made so as to vary it in degree according as may be found suitable for different cows or even for the different teats of the same cow.

It is a matter of common knowledge that the teats of a cow's udder frequently differ as regards the amount of milk they will yield and that different cows vary considerably as to the ease with which they can be milked, also that serious injury may be done to a cow if it is either not completely milked or if suction is continued on a teat which is empty. Cows may even be wholly spoiled as regards the giving of milk by wrong usage. It is thus of the utmost importance that a milking-machine should be capable of adjustment to suit the nature and condition of each individual cow.

The objects above mentioned are attained by the mechanism illustrated in the accompanying drawings, in which—

Figure 1 is a perspective view of the complete machine. Fig. 2 is a sectional view showing the operation of the parts on the outward stroke of the piston, and Fig. 3 is a similar view showing the operation on the inward stroke of the piston.

Similar letters refer to similar parts throughout the several views.

The receptacle or bucket A, the cross-bar and brackets B, and the uprights D constitute the framework of the machine. In the bearings E turns the four-throw crank-shaft C, provided at one end with the sprocket-wheel F, and in the bearings G turns the shaft H, provided at one end with the crank-handle J and at the other end with the sprocket-wheel I, the two sprocket-wheels I and F being connected by means of a chain K. By this means motion is transmitted from the handle J to the pump-plungers, the handle being supported above the crank-shaft in order that it shall be more convenient to manipulate. It may also be mounted thus in order to increase the speed or power of the machine; but ordinarily this is not necessary, and the sprocket-wheels F and I are of equal size.

The pumps L and pistons N are substantially the same as are described in the British Patent No. 6,043 of 1900; but in addition thereto I now provide the non-return valve Q and the air-valve R. The action of the pump is also the same, the piston-rod M when moving outward, Fig. 2, drawing the disk P tightly onto the piston N, thus closing the openings S therein and pressing the milk in front of the piston out of the delivery-tubes T at the same time that a vacuum is created behind the piston which opens the non-return valve Q and extracts milk from the udder along the tube U, connected to the teat-cup V. On the return stroke, Fig. 3, of the piston-rod the piston comes against the collar O on the piston-rod, leaving the passages S open for the passing of the milk, and the non-return valve Q, depressed by the spring W, closes the passage to the teat-cup, and thus retains all the milk within the pump. This non-return valve consists, as shown, of the disk Q, having a spindle attached which is guided in a tubular projection on the screwed plug X and is kept pressed on its seat by the spring W. Attached to the side of the non-return valve is an air-valve R, which, in conjunction with the passage Z Z, allows of air being admitted to the tube U. The valve R is provided with a threaded portion Y, by which the amount of opening of the passage Z can be varied.

It will be seen upon reversal of the piston, as shown in Fig. 3, the valve Q will be shut, aided partly by the vacuum in the pipe U and partly by the spring W, and that the passage Z is then the only connection between the pump-barrel and the tube U. But for this passage Z the valve Q would maintain a continuous vacuum in the tube U; but since air can pass the piston on its inward stroke—*i. e.* as shown in Fig. 3—it will also pass the valve R when open and tend to reduce the vacuum in the tube U, and consequently an alternate rise and fall of the vacuum in the tubes will be produced, which facilitates the act of milking. The amount of air passing can be regulated by the position of the screw Y. For an easy milking cow the screw is unscrewed to such an extent that as much air as possible can get to the milking-cups, thus diminishing the difference between the maximum and minimum rarefaction and resulting in the suction effect being a more gentle one. For a hard milking cow, on the other hand, the screw is kept nearly or it may be quite closed, so giving the maximum sucking effect. When this suction effect is great, it has been the case that the flexible teat-cups which have mainly been used have contracted—being made of rubber or of some such material—and have compressed the teat within them, and this contraction has been held to be of advantage to the milking effect. My experiments, however, have shown me that this is not the case, that it is unfavorable to the milking, and that it causes pain to the cow, and I have much improved this milking apparatus by employing milking-cups V, of metal or other solid material, which do not press on the teats at all, but suck directly on the udder, being quite plain, except that they are provided at the top with a beading $a$ and at the bottom with a nipple $b$, to which the flexible milking-tube U is attached. They are made, preferably, of thin tinned metal and are thus of but small weight, easier to clean than rubber, and more durable.

Since considerable strength is required in the cup, the old forms of rubber were necessarily of great thickness. The smaller size of the metal cups is of advantage in that they can be used on any cow, even with young or small cows, having teats close to one another, and more readily than the rubber ones on a cow having teats projecting from the udder at an angle.

As soon as a teat is emptied by this apparatus the air-screw may be withdrawn, so as to open valve R fully. The milking-cup may then be detached or the milking-tube itself may be detached from the machine.

What I claim as my invention, and desire to secure by Letters Patent, is—

1. In a milking-machine, the combination with a multiple suction-pump having a separate barrel, outlet-tube, inlet-tube, and teat-cup, to each teat of the animal, a piston-rod having a shoulder, a valve secured to the inner end of the rod, and a piston having passages therethrough and working loose on the rod between the said shoulder and valve, of an induction-valve interposed between each barrel and each teat appliance so that each teat can be separately disconnected from the pump by disconnecting the inlet-tube.

2. In a milking-machine, the combination with a multiple suction-pump having a separate barrel, outlet-tube, inlet-tube, and teat-cup, to each teat of the animal, a piston-rod having a shoulder, a valve secured to the inner end of the rod, and a piston having passages therethrough and working loose on the rod between the said shoulder and valve, of an induction-valve interposed between each barrel and each teat appliance, and a passage past the induction-valve establishing a connection between the inlet-tube and the barrel, for the purpose of rendering the suction effect intermittent.

3. In a milking-machine, the combination with a multiple suction-pump having a separate barrel, outlet-tube, inlet-tube, and teat-cup to each teat of the animal, a piston-rod having a shoulder, a valve secured to the inner end of the rod, and a piston having passages therethrough and working loose on the rod between the said shoulder and valve, of an induction-valve interposed between each barrel and each teat appliance, a passage past the induction-valve establishing a connection between the inlet-tube and the barrel, and a regulating-valve in said passage whereby the suction on the teat is reduced on the return stroke of the piston and an intermittent action produced on each teat independently.

4. In a cow-milker, the combination of a multiple suction-pump having a separate barrel, outlet-tube, inlet-tube, and teat-cup to each teat of the animal, a piston-rod having a shoulder, a valve secured to the inner end of the rod, a piston working loose on the rod between the said shoulder and valve and having passages parallel with the rod, an induction-valve interposed between each barrel and each teat appliance, a passage past the induction-valve, a regulating-valve in said passage for regulating the suction on each teat, a multiple-throw crank-shaft, a counter-shaft having a crank-handle, bearings supporting the counter-shaft and elevating the handle, and suitable means for connecting the crank-shaft with the counter-shaft.

In testimony that I claim the foregoing as my invention I have signed my name in presence of two subscribing witnesses.

PETER ANDERSEN.

Witnesses:
HEINRICH LORENZ THEODOR MAHNCKE,
CARL KECHA.